United States Patent
Peckham et al.

(10) Patent No.: US 7,024,287 B2
(45) Date of Patent: Apr. 4, 2006

(54) FLIGHT MANAGEMENT COMPUTER LATERAL ROUTE RECAPTURE

(75) Inventors: Roger D. Peckham, Glendale, AZ (US); Jimmy Ray Rumbo, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/627,491

(22) Filed: Jul. 25, 2003

(65) Prior Publication Data

US 2006/0025899 A1    Feb. 2, 2006

(51) Int. Cl.
*G05D 1/08*    (2006.01)

(52) U.S. Cl. .......................................... 701/3

(58) Field of Classification Search ............. 701/1, 701/3, 4, 9, 14–16, 18; 340/972, 976, 979
See application file for complete search history.

(56) References Cited

U.S. PATENT DOCUMENTS 5,568,390 A * 10/1996 Hirota et al. ............... 701/201
6,163,744 A * 12/2000 Onken et al. ................... 701/3
6,173,219 B1    1/2001 Deker

FOREIGN PATENT DOCUMENTS

WO    WO95/19547 A    7/1995

OTHER PUBLICATIONS

Schruer, Jon M., "B737 Flight Management Computer Flight Plan Trajectory Computation and Analysis," Proceedings of the 1995 American Control Conference, American Autom Control Council, Evanston, IL., USA, vol. 5, Jun. 1996, pp. 3419-3424.

* cited by examiner

*Primary Examiner*—Thu V. Nguyen
(74) *Attorney, Agent, or Firm*—Andrew A. Abeyta (57) ABSTRACT

An aircraft flight management system having a flight management computer that stores a pre-planned lateral route of flight of the aircraft comprising a plurality of successive waypoints to be overflown, the next proximate waypoint being an active waypoint, a method providing a return-to-path maneuver in the event that the aircraft deviates from the pre-planned route, including selecting a new active waypoint, calculating a return-to-path route to overfly the new active waypoint, and selectably accepting the calculated return-to-path route.

16 Claims, 10 Drawing Sheets

FLIGHT MANAGEMENT COMPUTER LATERAL ROUTE RECAPTURE

TECHNICAL FIELD

The present invention generally relates to flight management computers, and more particularly relates to establishing continuation of a stored flight path of an aircraft after an unplanned deviation from the stored flight path.

BACKGROUND

Flight Management Computers (FMCs) are used to allow the entry, by a flight crew, of a pre-planned route from the origin of the flight to the destination. This lateral route is established by entering a series of waypoints, usually identified by aircraft navigation stations such as VHF Omnidirectional Radio (VOR) stations, Automatic Direction Finder (ADF) stations, Instrument Landing System (ILS) stations providing localizer and glide slope information as well as marker beacons to annunciate, for example, distance to a runway, or the like.

Each of the series of waypoints from the origin of the flight to the destination is entered into the FMC in sequence, and the FMC may display the lateral route, or a portion of it, and may also, through cooperation with an automatic pilot, actually fly the aircraft along the entered lateral route, overflying each waypoint in succession until the terminal point of the flight is reached. This route is flown by the FMC using a lateral control law and sequencing logic. The FMC creates errors to the path and maneuvers the aircraft to zero out those errors.

Often, however, the flight crew may deviate from the pre-planned route, either on their own or as a result of an Air Traffic Control (ATC) instruction to so deviate due to nearby traffic or other routing considerations. In such event, the crew tactically maneuvers the aircraft to a new heading either by engaging the autopilot heading select mode and dialing in a new heading, or by flying the aircraft manually, thus causing the aircraft to fly off the pre-planned route. Once the air traffic conflict or other cause for deviation from the planned route is resolved, ATC allows the aircraft to return to the pre-planned FMC route.

Most FMCs include a Control and Display Unit (CDU). The CDU is the unit that actually stores the flight plan entered by the crew. Some CDUs have a feature known as a "Legs Page" that displays the information relating to each of the legs of the flight plan including waypoints, headings, navigation station identifiers, etc. The then-active leg is at the top of the page and the CDU determines when the wayline (which is a line perpendicular to the terminus of the leg) for that leg is passed, at which point the next successive leg becomes the active leg and appears at the top of the legs page. Even if the FMC is in Heading mode, the CDU keeps track of the active leg so long as the aircraft is within some number of nautical miles (for example, twenty one nautical miles) of the flight plan path. If the aircraft is more than twenty nautical miles from the planned flight path, the CDU no longer keeps track of the active leg. The twenty one nautical miles is, of course, somewhat arbitrary and could be some other distance in accordance with system design preferences.

Typically, in order to return to the pre-planned FMC route a series of activities on the part of the flight crew must take place. The crew must:

1. Decide on the most appropriate waypoint to return to in the pre-planned route. The most appropriate waypoint may be the then-active waypoint, the waypoint closest to the aircraft, the waypoint closest to, yet ahead of, the aircraft's present position, a down-path waypoint that results in the lowest recapture bank angle, or an intercept course to the leg into any of the aforementioned waypoints.
2. Down select this waypoint into the Scratch-Pad of a Control and Display Unit (CDU).
3. Up-select this waypoint from the Scratch Pad to the top of the route on the Legs Page of the CDU (or alternatively, enter an intercept course to the active leg).
4. Verify the modification of the lateral map display.
5. Press EXEC on the CDU.
6. Select LNAV (Lateral Navigation Mode) on the Mode Control Panel (MCP) so that the FMC commands the autopilot to recapture the pre-planned route.

In addition to the actions noted above, the crew must also create an efficient path back to the pre-planned route by taking the shortest path back to the pre-planned route using as few banking maneuvers as possible to assure passenger comfort. In addition to the Direct-To path described, the crew can also elect to fly an intercept course into the active waypoint. Each of these activities requires "head down" time by the crew, which is a safety issue, and requires substantial time to make the necessary calculations to return the aircraft to its original pre-planned route as computed by the FMC.

If the aircraft flies past one or more waypoints, the FMC commonly does not sequence those waypoints if certain conditions exist, for example, if the aircraft is more than twenty one nautical miles from the pre-planned flight path. This is an additional problem faced by the crew since they must realize this condition and perform additional keystrokes on the CDU to remove the non-sequenced legs from the pre-planned route. It is also quite common that the crew will be unaware when clearance back to the pre-planned route will be granted. Therefore, once clearance is granted by ATC, the crew is suddenly faced with performing the above actions, which further diminishes their alertness to safety to handle a heads down action.

Accordingly, it is desirable to provide an automated method of selecting a new active waypoint and providing a return to path maneuver that can eliminate a number of the steps noted above. In addition, it is desirable to provide a method for reducing errors associated with returning to the pre-planned route and minimize the heads down time spent resolving the route. Furthermore, other desirable features and characteristics of the present invention will become apparent from the subsequent detailed description and the appended claims, taken in conjunction with the accompanying drawings and the foregoing technical field and background.

BRIEF SUMMARY

An aircraft flight management system having a flight management computer that stores a pre-planned lateral route of flight of the aircraft comprising a plurality of successive waypoints to be overflown, the next proximate waypoint being an active waypoint, a method providing a return-to-path maneuver in the event that the aircraft deviates from the pre-planned route, including selecting a new active waypoint, calculating a return-to-path route to overfly the new active waypoint, and selectably accepting the calculated return-to-path route.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Modern commercial aircraft have Flight Management Computers (FMCs) to assist the flight crew in flying and navigating the aircraft, and which allow the entry into a Control and Display Unit (CDU), which may be a Multi-function Control/Display Unit (MCDU), of certain waypoints defining the route along which the aircraft is to fly. The present invention is an addition to existing Flight Management Computer functionality that is operable to select or define new waypoints to guide the aircraft back to its pre-planned route after a deviation from that route due to crew decision or Air Traffic Control instruction. The invention determines which waypoint of the pre-planned waypoints should become the "active" waypoint for a return to route. An active waypoint is the waypoint toward which the aircraft flies when the autopilot LNAV (Lateral Navigation) mode is selected. It is also the first waypoint of the Legs page of the CDU.

Figure 1:
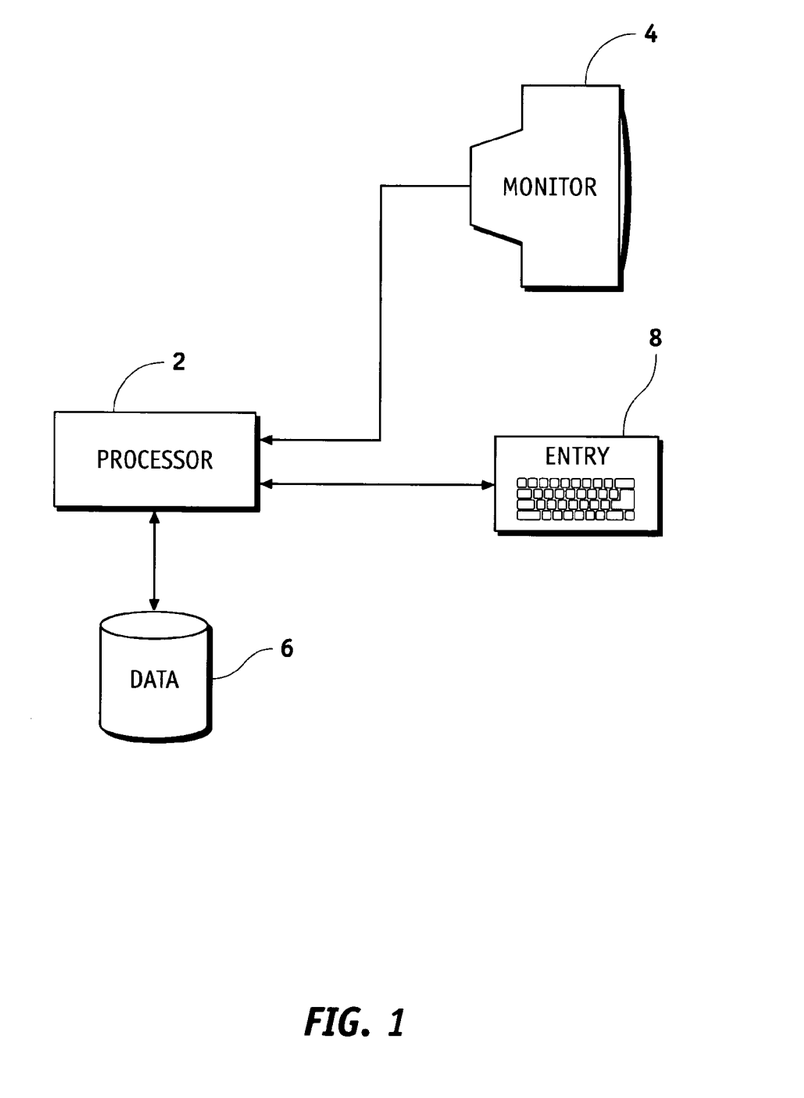
FIG. 1 is a block diagram illustrating one embodiment of a flight management system in accordance with the present invention.

FIG. 1 is a block diagram illustrating one embodiment of a flight management system in accordance with the present invention. It should be appreciated that the functional blocks illustrated may be realized by any number of hardware, firmware, and/or software components configured to perform the specified functions. For example, the present invention may employ various integrated circuit components such as memory elements, digital signal processing elements, look-up tables, databases, and the like, which may carry out a variety of functions under the control of one or more microprocessors or other control devices. Such general techniques and components that are known to those skilled in the art are not described in detail herein.

It should be further understood that the exemplary process or processes illustrated may include more or fewer steps or may be performed in the context of a larger processing scheme. Furthermore, the various flowcharts presented in the drawing figures are not to be construed as limiting the order in which the individual process steps may be performed.

In FIG. 1 a system is shown that functions in accordance with various aspects of the present invention. A processor 2 is configured to communicate with and associated monitor (or monitors) 4, one or more navigational or avionics data sources 6 and a text entry device 8. In general a user or operator (e.g., a pilot or crewmember) located within the aircraft (not shown) provides input to the processor 2 through text entry device 8 and receives visual feedback via a display produced by monitor 4. Monitor 4 may be a Control and Display Unit (CDU) or a multifunction Control/Display Unit (MCDU) or another graphical display, and further may display various information such as textual identifiers associated with the aircraft's regional airways, waypoints, and procedures as determined from avionics data and/or navigational data sources 6. Through use of the text entry device 8, a user (hereinafter the pilot) may enter and/or modify the flight plan of the aircraft and/or such other indicia in accordance with the visual feedback provided by monitor 4.

Text entry device 8 may include any device suitable to accept alphanumeric character input from the pilot and convert that input to alphanumeric text on monitor 4, including keyboards, key pads, trackballs, knobs, and other devices known in the art. Monitor 4 may include any display monitor suitable for displaying the various symbols and information associated with an aircraft's airways, waypoints, or procedures. Many currently known monitors are suitable for this task, including various CRT and flat-panel display systems. Processor 2 encompasses one or more functional blocks used to provide control and calculation of typical flight management systems, including communicating with the text entry device 8 and monitor 4. In this regard, processor 2 may include any number of individual microprocessors, memories, storage devices, interface cards, and other standard components known in the art.

While the processor 2, monitor 4 and data entry device 8 are shown as separate devices in FIG. 1, it is understood that two or more of the devices may be combined into a single unit, for example a CDU or MCDU.

Data sources 6 include various types of data required by the system, for example, state of the aircraft data, flight plan data, data related to airways, waypoints and associated procedures (including arrival, approach and departure procedures), navigational aids (Navaids), symbol textures, navigational data, obstructions, font textures, taxi registration, special use airspace, political boundaries, communication frequencies (enroute and airport), approach information, and the like.

The present invention is active when LNAV is in its disengaged state, that is, when heading mode is selected and a new heading is entered into the FMC or when the aircraft is being flown manually. Based on the location of the aircraft relative to the pre-planned path, this invention determines which waypoint of the pre-planned route should be the active waypoint for a return to the pre-planned route, and calculates the lateral path to return the aircraft to the leg into that new waypoint. The new return to path flight plan is then presented to the crew for acceptance. While LNAV is disengaged the active route is not modified in any way. Only when LNAV is rearmed is the logic presented to the crew with a return to path flight plan modification that can be either accepted or rejected by the crew.

Figure 2:
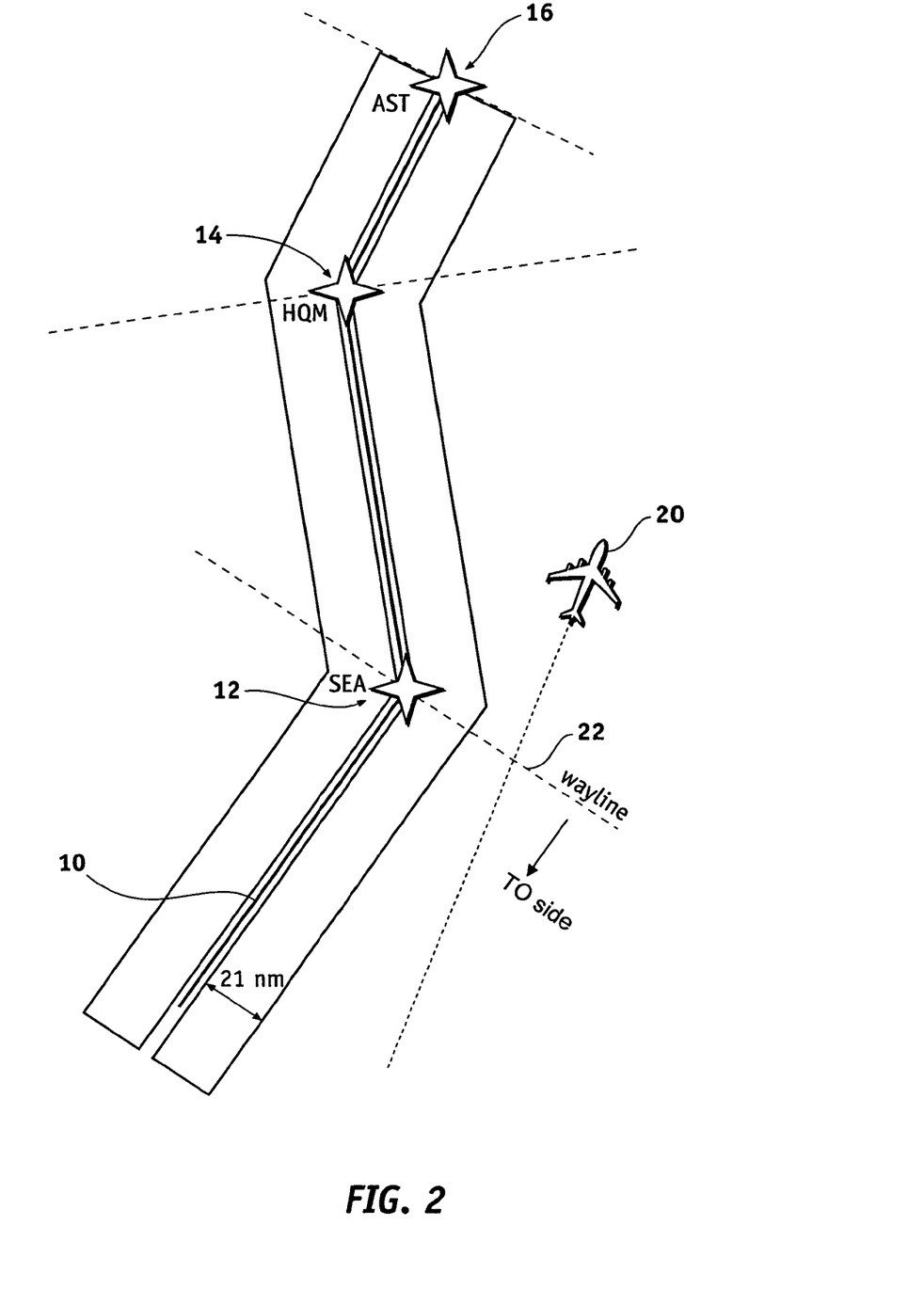
FIG. 2 is an example route illustrating the candidate waypoint choice using the logic of FIG. 3.
Figure 3:
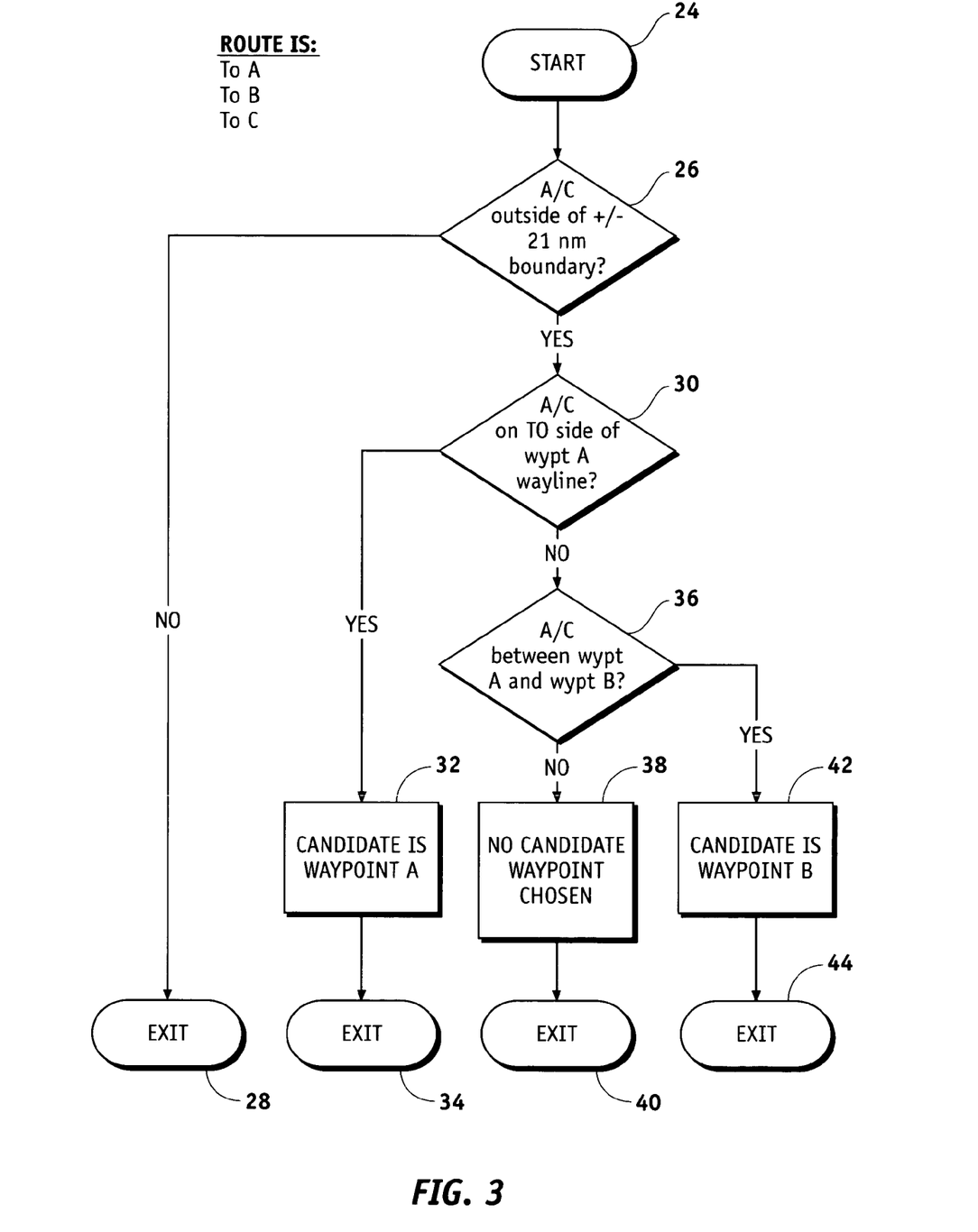
FIG. 3 is a flow diagram showing the logic to determine a candidate active waypoint for return to a pre-planned route.

FIG. 2 is an example route illustrating the candidate waypoint choice using the logic of FIG. 3. FIG. 3 is a flow diagram showing the logic to determine a candidate active waypoint for return to a pre-planned route. For clarity and ease of understanding, FIG. 2 and FIG. 3 will be discussed together. FIG. 2 shows a portion of a typical flight path 10 having three waypoints, SEA 12, HQM 14 and AST 16. An aircraft 20 is shown, the aircraft 20 having already deviated from the pre-planned flight path 10. At the time of deviation from the pre-planned path 10, the active waypoint was SEA 12 and, since LNAV is now disengaged in order to deviate form the pre-planned path 10, SEA 12 remains for the time being the active waypoint.

If, at this time, ATC directs a return to the original flight path 10, the logic as expressed by the flow diagram of FIG. 3 begins to select an appropriate waypoint to get the aircraft back to the pre-planned route. The algorithm begins at 24 and proceeds to determine at 26 whether the aircraft is outside a twenty one nautical mile boundary of the original route 10. If the aircraft is within twenty one nautical miles of the pre-planned flight path, the FMC will automatically sequence waypoints as originally entered, that is, if the aircraft passes the wayline of a waypoint, the next waypoint is selected as the active waypoint and appears at the top of the MCDU legs page. If the aircraft is more than twenty one nautical miles from the originally entered flight plan, however, the waypoints are not automatically sequenced, since it would become excessively burdensome for the FMC to calculate all possible leg geometry cases in an attempt to sequence down-path legs, and the program exits at 28. The twenty one nautical mile distance is somewhat arbitrary and is a matter of design choice. Any other mileage limitation could be used as well.

If, on the other hand, the aircraft is inside the twenty one nautical mile distance from the pre-planned flight path 10 it is determined at 30 whether the aircraft is on the TO side of the wayline of the previously active waypoint. The wayline is a threshold depicted as a line perpendicular to the inbound course of a waypoint and positioned at the waypoint itself. If the aircraft is on the TO side of wayline 22 (FIG. 2), the best candidate as determined at 32 for a new active waypoint is SEA 12. The program then exits at 34.

In the example of FIG. 2, however, the aircraft 20 is beyond the TO side of waypoint SEA 12, so a determination is made at 36 whether the aircraft is between waypoint SEA 12 and waypoint HQM 14. If not, no candidate waypoint is chosen at 38 and the program exits at 40. If the aircraft is between waypoint SEA 12 and waypoint HQM 14, however, the candidate waypoint chosen at 42 is waypoint HQM 14, and the program exits at 44.

If the logic of FIG. 3 is able to determine a candidate waypoint, it next must be determined whether a return path can be built to the leg associated with that waypoint. If the aircraft is currently within the normal capture region of the candidate waypoint's leg (i.e., +/− 1.5 nm, or within an adaptive capture range), the aircraft is close enough to the original pre-planned active leg to be within the capture region of the existing guidance algorithm that engages LNAV and maneuvers the aircraft back to the active leg.

Figure 4:
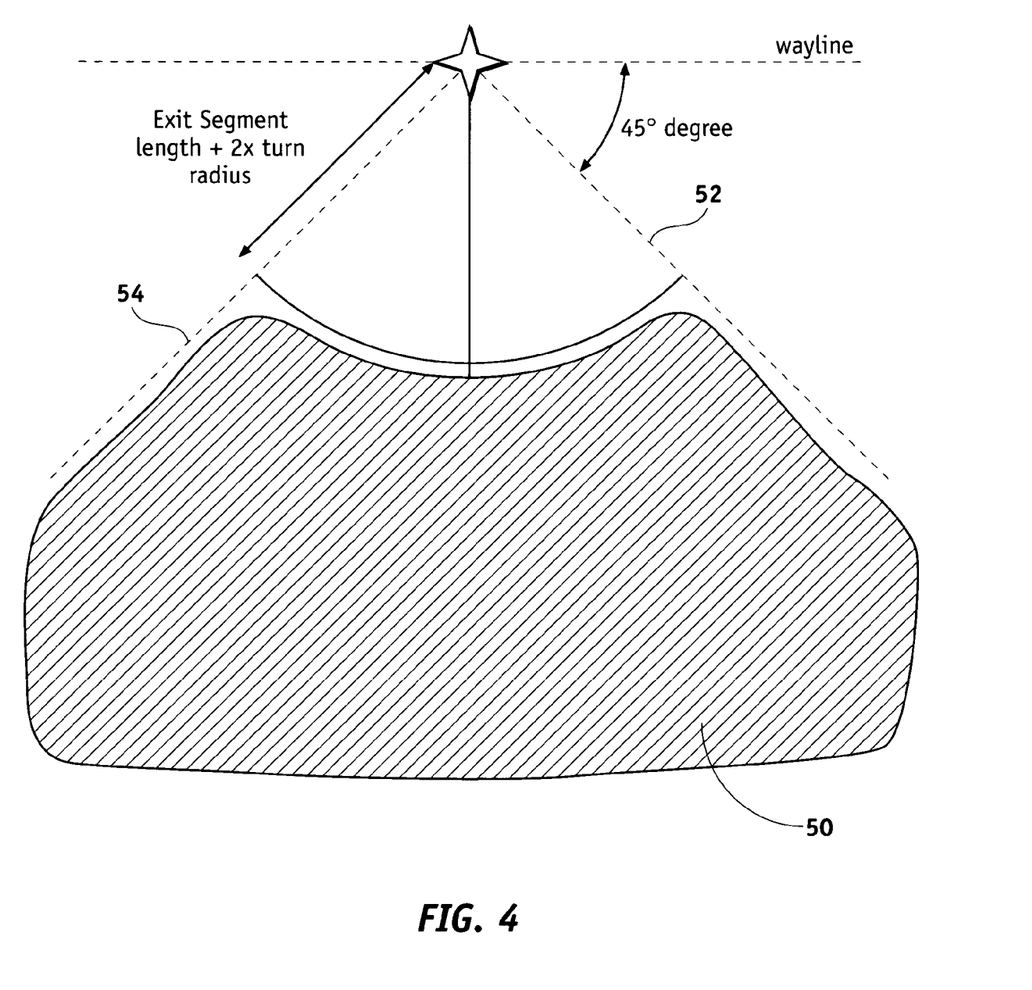
FIG. 4 is an illustration of the capture region within which the present invention will create a route recapture plan.

If the aircraft is outside the normally defined capture region, however, another capture region is checked as illustrated in FIG. 4. If a path can be built from the aircraft's present position to the leg (at an intersection of forty five degrees) while staying within the region indicated at 50, then a return path can be built. If the return path falls outside the area 50, a return path cannot be built and the program exits. If the shortest turn distance from the present aircraft position to a point called "X" orienting the aircraft on a on a forty five degree intercept to the inbound leg, and point "X" is within the hatched area, then by definition the returning intercept leg will be within the dashed lines 52 and 54.

Figure 5:
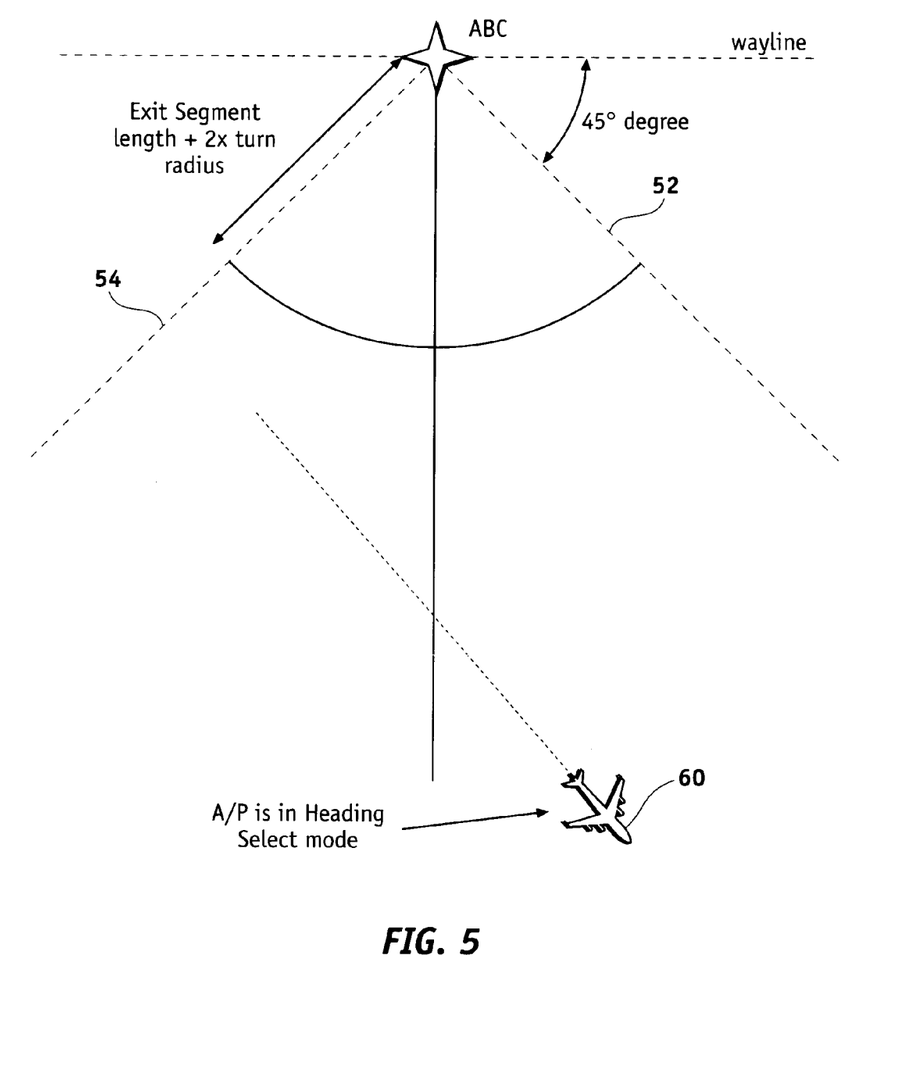
FIG. 5 is a diagram of an aircraft position that meets the criteria of the route recapture system of the present invention.

Once the algorithm determines that a return path is possible, an orientation path is constructed from the nose of the aircraft so as to turn the aircraft the shortest angular distance at a bank angle of no more than twenty five degrees to an intercept angle of forty five degrees to the candidate's leg. The twenty five degree bank limitation is somewhat arbitrary, and is selected in accordance with passenger comfort and the characteristics of the aircraft. Another bank limitation could be selected, if desired. FIG. 5 is a diagram showing an aircraft 60, operating in Heading Select mode (since the aircraft has deviated from the pre-planned flight path) but within the area in which a return path can be calculated.

Figure 6:
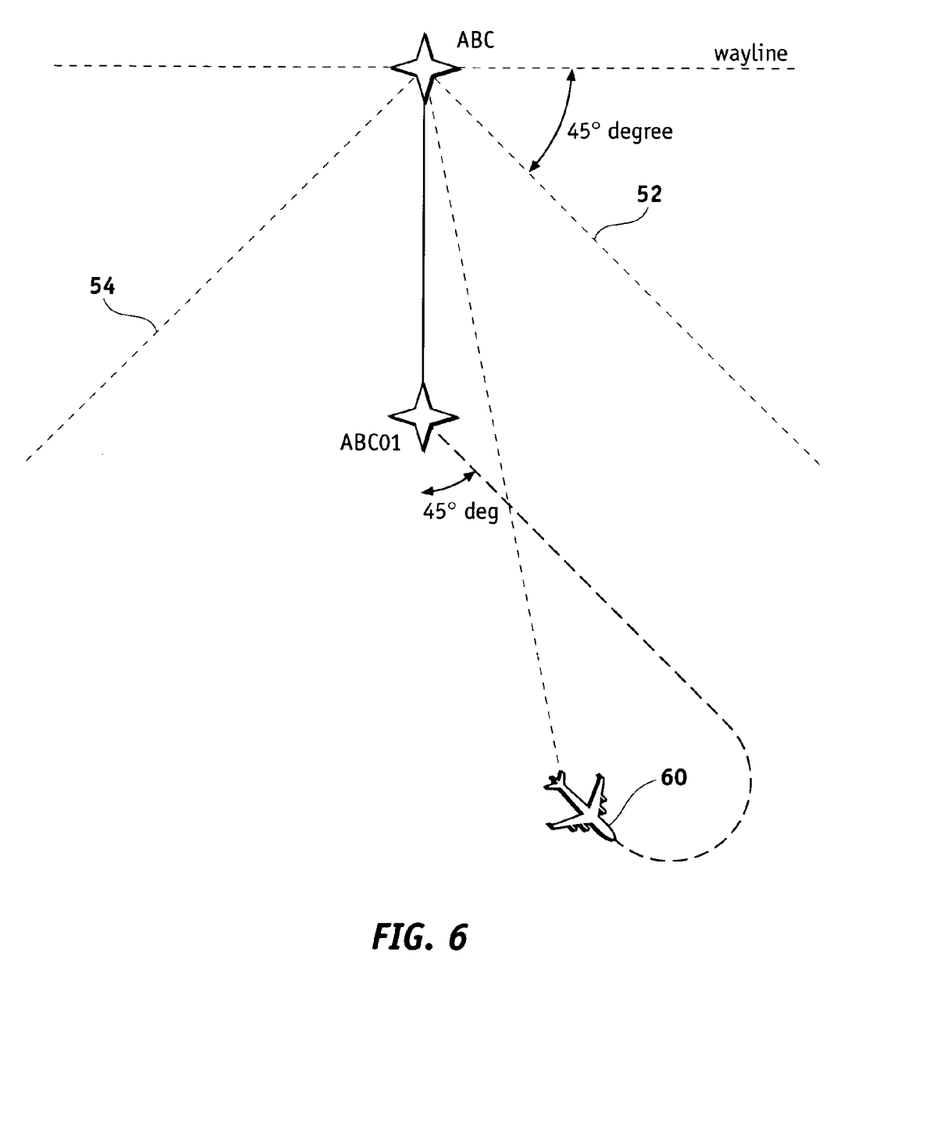
FIG. 6 is a diagram of an aircraft position and the route recapture solution of the present invention.

FIG. 6 is a diagram of an aircraft 60 position as in FIG. 5 and the route recapture solution created by the present invention. After the return route has been calculated and accepted by the pilot, LNAV is armed and the FMC resumes control of the aircraft. In this case the shortest turn to the candidate waypoint ABC is a turn to the left as illustrated. The turn is continued until a heading is reached that will place the aircraft on a forty five degree intercept to the leg to waypoint ABC. To accomplish this, the present invention creates a track waypoint (or virtual waypoint) ABC01 toward which the aircraft is directed. Upon reaching track waypoint ABC01 the aircraft intercepts the leg to ABC and continues toward that waypoint.

Figure 7:
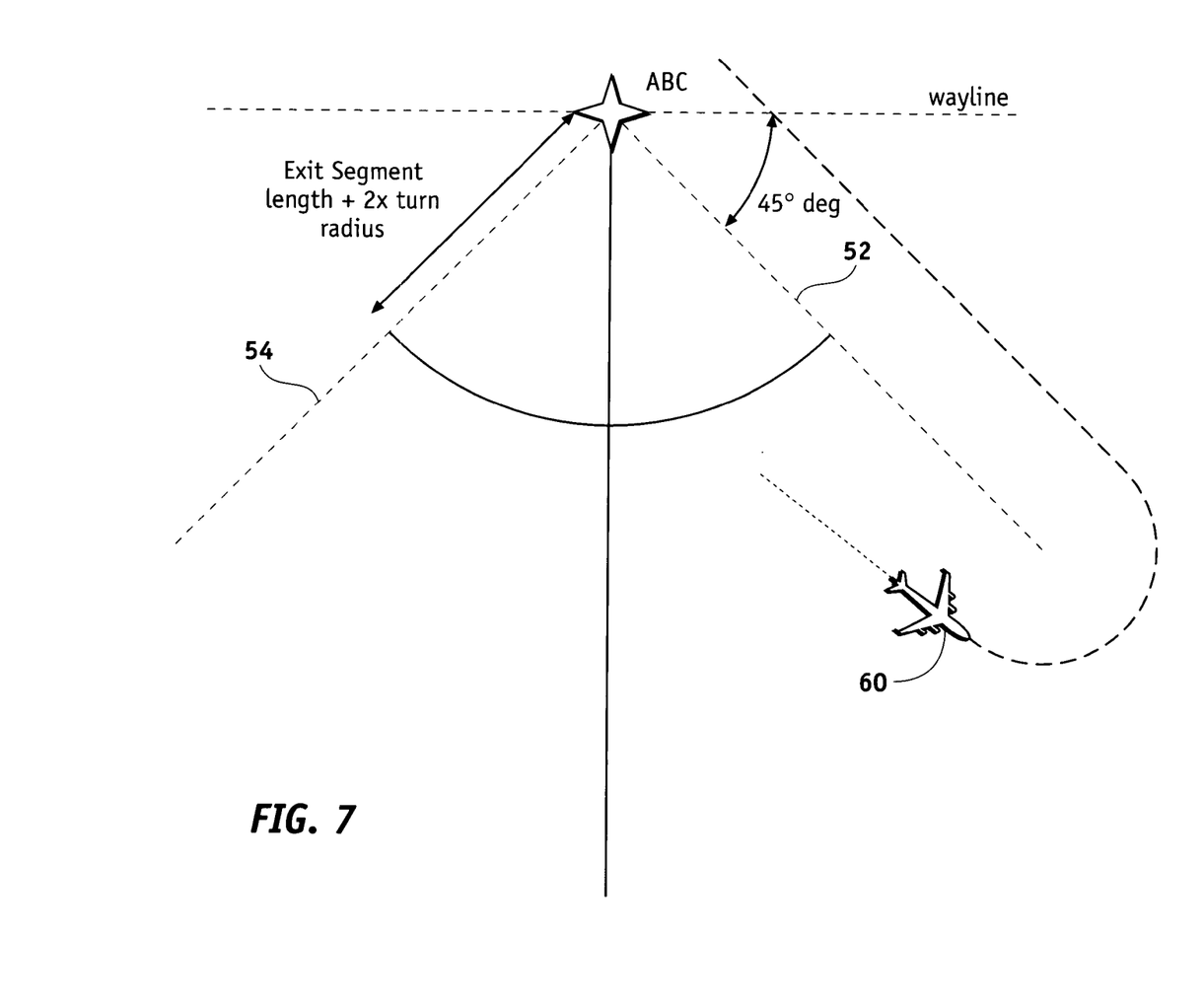
FIG. 7 is a diagram of an aircraft in a position that does not meet the criteria of the algorithm of the present invention.

FIG. 7 is a diagram of an aircraft 60 in a position that does not meet the criteria of the algorithm of the present invention, and for which a return path cannot be constructed. As shown in FIG. 7, the aircraft 60 is in a position and on a heading that requires a turn to the left, the shortest turn to the candidate waypoint ABC, but the turn will place the aircraft outside the bound of line 52 and therefore no return path is built. Again, the bounds of the area in which a return path may be calculated is somewhat a matter of design choice, and the forty five degree orientation of lines 52 and 54 could be some other orientation, for example forty degrees.

Figure 8:
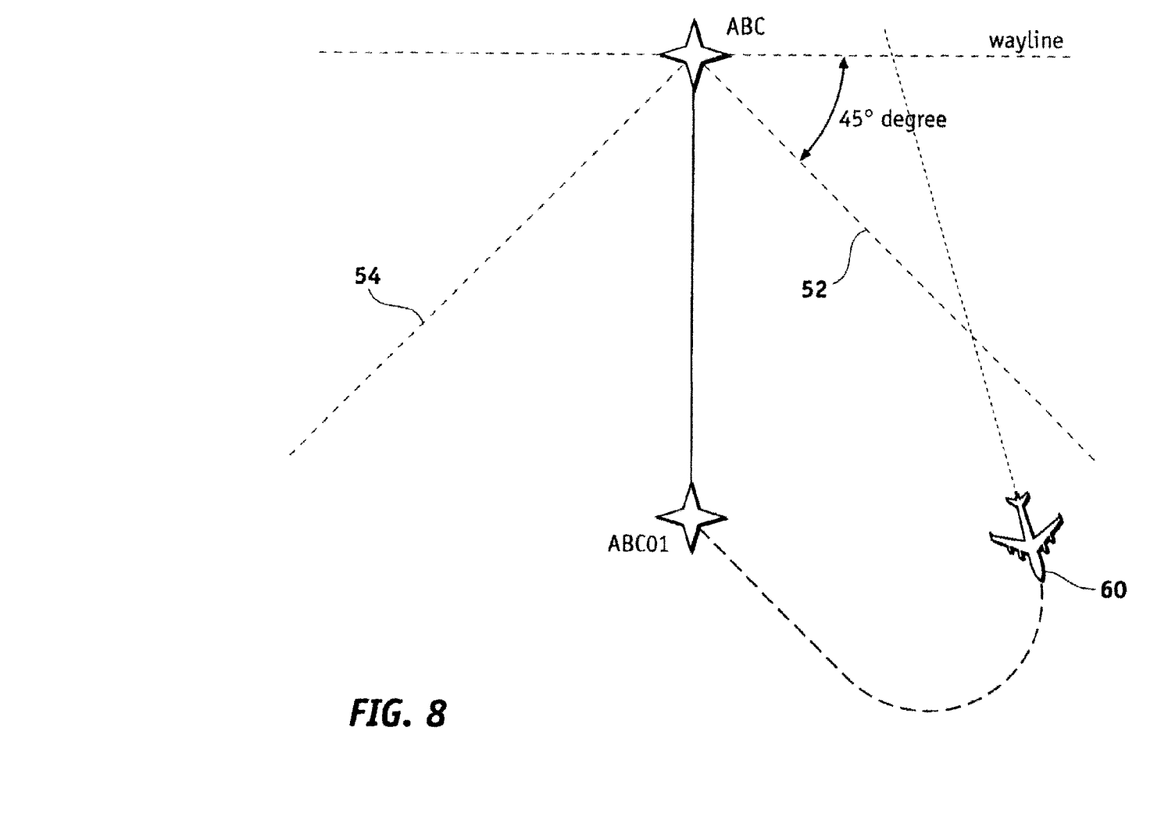
FIG. 8 a diagram of an aircraft in a position and at a heading that meets the route construction criteria of the present invention, but requires a right turn.

FIG. 8 is a diagram of an aircraft in a position and at a heading that meets the route construction criteria of the present invention, but requires a right turn (the shortest turn to the candidate waypoint ABC). The shortest turn to the candidate waypoint ABC is a turn to the right as illustrated. The turn is continued until a heading is reached that will place the aircraft on a forty five degree intercept to the leg to waypoint ABC. To accomplish this, the present invention creates a track waypoint (or virtual waypoint) ABC01 toward which the aircraft is directed. Upon reaching track waypoint ABC01 the aircraft intercepts the leg to ABC and continues toward that waypoint. As in FIG. 6, after the return route has been calculated and accepted by the pilot, LNAV is armed and the FMC resumes control of the aircraft.

Figure 9:
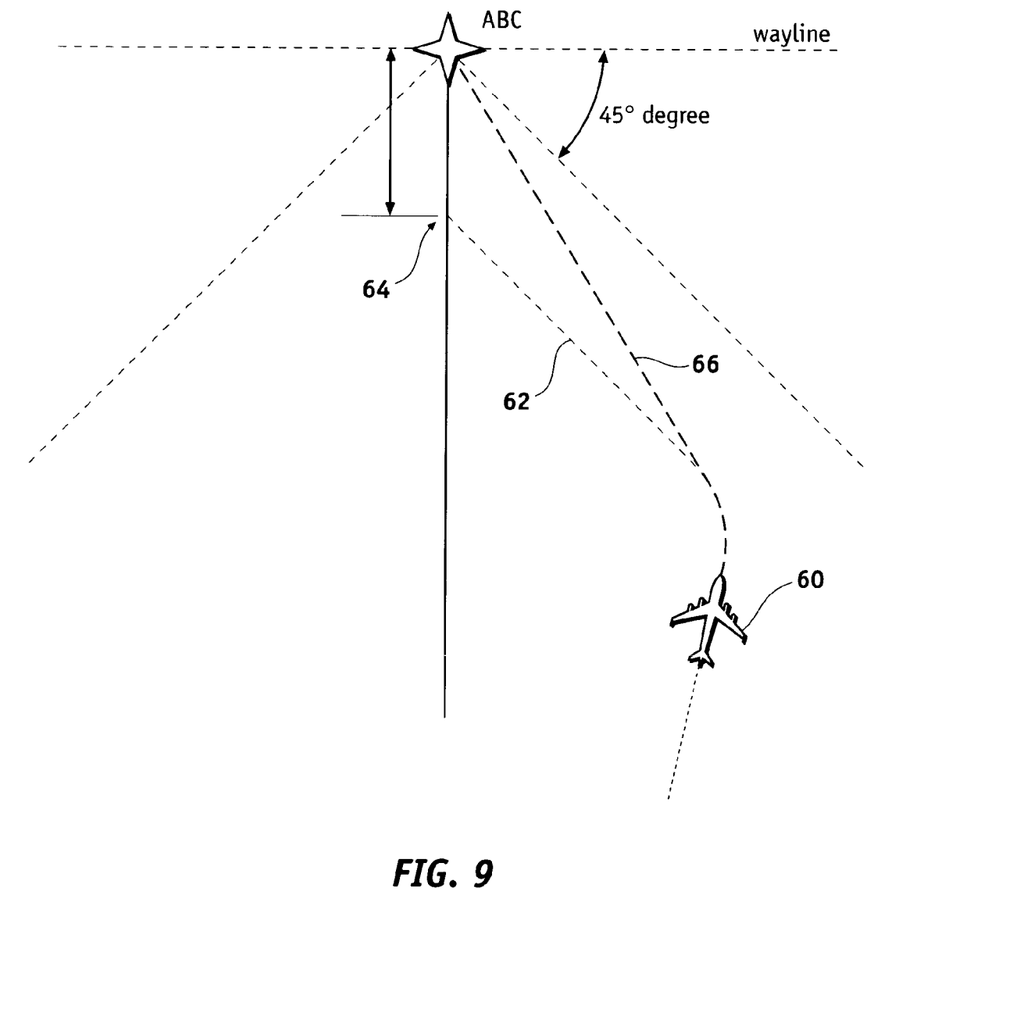
FIG. 9 is a diagram showing a special case wherein the normally calculated return path to a forty five degree intercept of the active waypoint leg places the intercept within one nautical mile of the actual waypoint.

FIG. 9 is a diagram showing a special case wherein the normally calculated return path to a forty five degree intercept of the active waypoint leg places the intercept within one nautical mile of the actual waypoint. In such a case the aircraft 60 makes a turn to the left, but instead of following a path 62 to a forty five degree intercept, since the intercept point 64 is within one nautical mile of candidate waypoint ABC, the present invention calculates a Direct-To (DF) leg 66 to the candidate waypoint ABC.

Figure 10:
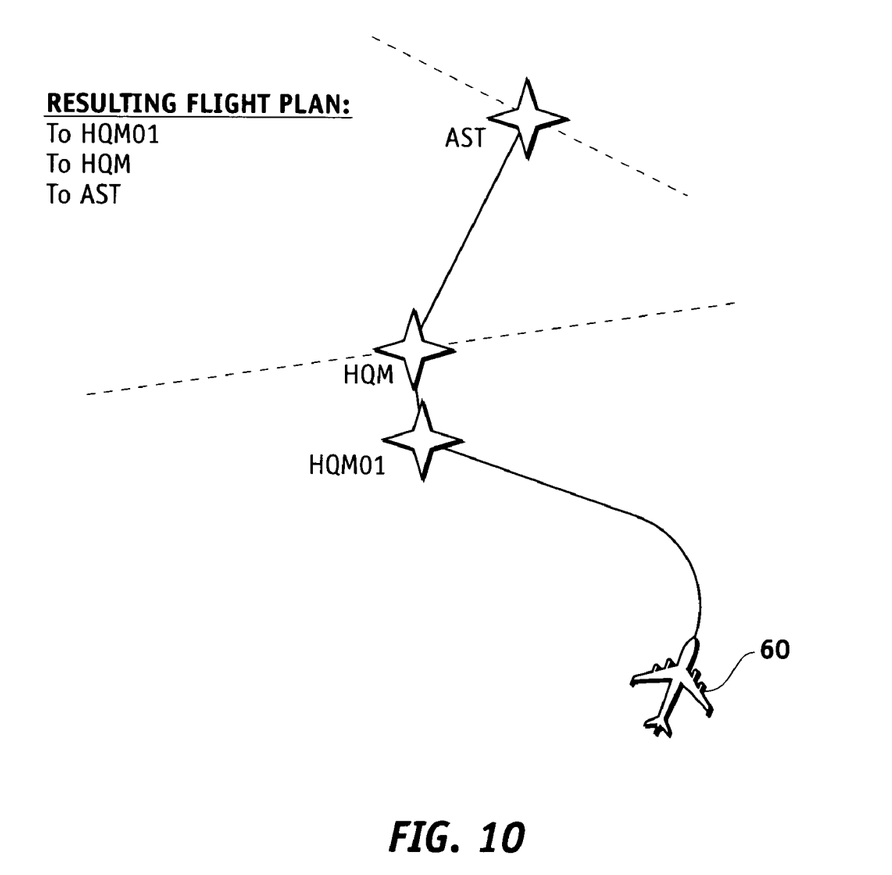
FIG. 10 illustrates a typical scenario of an aircraft flying off the pre-planned flight path and then later being commanded to return to the pre-planned flight path.

FIG. 10 illustrates another typical scenario of an aircraft flying off the pre-planned flight path and then later being commanded to return to the pre-planned flight path. In such a case the aircraft 60, once the calculated return to path is accepted by the pilot, turns to the left (shortest turn to the candidate waypoint) and proceeds to virtual waypoint HQM01 which it intercepts at a forty five degree angle and then continues to original waypoint HQM and subsequently to AST.

In all of the above illustrations, as long as the aircraft is not in LNAV mode (that is, the autopilot mode that follows the original flight path), changes are not made to the stored flight plan. Upon calculation of the proposed return path, however, the pilot is given a view of the proposed return to path and is prompted to accept or reject the proposed plan. If the pilot rejects the proposed plan by, for example pressing the "clear" key on the CDU, nothing is changed and the pilot must manually return to the original or a modified flight plan. If the pilot accepts the proposed plan, however, by pressing the EXEC key of the CDU the existing pre-planned route is modified to include the calculated return-to path and upon selecting RNAV the aircraft begins to execute the necessary maneuvers to return to the flight path.

Thus there has been described a method and apparatus that reduces the "heads down" time of the pilot or flight crew in a situation that may be in a heavy traffic area requiring the attention of the crew outside the cockpit. The invention selects the most appropriate waypoint in which to make the new active waypoint thus bypassing lateral waypoints already behind the aircraft, provides the optimum return to path route given the variables associated with the selection (i.e., heading, position, and distance to go), and reduces the possibility of making incorrect entries into the CDU, MCDU or other graphical input device. The pilot, if satisfied with the calculated return-to path confirms acceptance of the path in order to execute the calculated path.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. In an aircraft flight management system having a flight management computer that stores a pre-planned lateral route of flight of the aircraft comprising a plurality of successive waypoints to be overflown, a method providing a return-to-path maneuver in the event that the aircraft deviates from the pre-planned route, comprising:
    if the aircraft is inside a preset boundary of the pre-planned lateral route:
        choosing either (i) a first waypoint from the waypoints of the pre-planned lateral route as a new candidate active waypoint if the aircraft is on the TO side of the wayline of the first waypoint or (ii) a second waypoint from the waypoints of the pre-planned lateral route as a new candidate active waypoint, the second waypoint following after the first waypoint, if the aircraft is between the wayline of the first waypoint and the wayline of the second waypoint, and
    calculating a return-to-path route to overfly the new candidate active waypoint if the aircraft is in a capture zone.

2. The method as set forth in claim 1 further comprising selectably accepting the calculated return-to-path route.

3. The method as set forth in claim 1 wherein the new candidate active waypoint is a down-path waypoint that results in a low recapture bank angle.

4. The method as set forth in claim 1 further comprising generating a virtual waypoint associated with the new candidate active waypoint.

5. The method as set forth in claim 4 wherein the virtual waypoint provides an intercept course the new candidate active waypoint.

6. The method of claim 5 wherein the virtual waypoint provides a tracking point that lies in the path of an aircraft on a forty five degree intercept path of the new candidate active waypoint.

7. The method of claim 1 further comprising the steps of determining if a return path can be built from the aircraft position to a leg associated with the new candidate active waypoint at an interception of forty five degrees while staying within the capture region is possible; and if the return path is possible, constructing an orientation path.

8. An aircraft flight management system comprising:
    a preplanned lateral route of flight of the aircraft comprising a plurality of flight legs connected by waypoints;
    a means for selecting a first waypoint from the waypoints of the preplanned lateral route of flight as a new candidate active waypoint if the aircraft is approaching a first wayline associated with the first waypoint and the aircraft is inside a predetermined distance from the pre-planned lateral route;
    a means for selecting a second way point from the waypoints of the preplanned lateral route of flight as the new candidate active waypoint, the second waypoint immediately downpath from the first waypoint, if the aircraft is between the waylines of the first waypoint and the second waypoint and the aircraft is inside a predetermined distance from the pre-planned lateral route; and
    a means for calculating a return-to-path route that overlies the new candidate active waypoint if the aircraft is inside a capture zone.

9. The flight management system as set forth in claim 8 further comprises a flight management computer comprising a memory for temporarily storing information and the new active waypoint is temporarily stored in the memory until the new active waypoint is selectably accepted.

10. The flight management system as set forth in claim 8 wherein, upon selecting the new candidate active waypoint the pre-planned route is modified to include the new candidate active waypoint.

11. The flight management system as set forth in claim 8 wherein the new candidate active waypoint is a down-path waypoint that results in a low recapture bank angle.

12. The flight management system as set forth in claim 8 further comprising generating a virtual waypoint associated with the new candidate active waypoint.

13. The flight management system as set forth in claim 12 wherein the virtual waypoint provides an intercept course to a new candidate active waypoint.

14. The flight management system as set forth in claim 13 wherein the calculated return-to-path route may be selectively accepted.

15. The flight management system of claim 13 wherein the virtual waypoint provides a tracking point that lies in the path of an aircraft on a forty five degree intercept path of the new candidate active waypoint.

16. The flight management system of claim 8 further comprising a means for determining if a return path can be built from the aircraft position to a leg associated with the new candidate active waypoint at an interception of forty five degrees while staying within the capture region is possible; and if the return path is possible, constructing an orientation path.

* * * * *